(12) United States Patent
Hanaoka et al.

(10) Patent No.: US 10,922,091 B2
(45) Date of Patent: Feb. 16, 2021

(54) DISTRIBUTED REALTIME EDGE-CORE ANALYTICS WITH FEEDBACK

(71) Applicant: Hitachi, Ltd., Tokyo (JP)

(72) Inventors: Miyuki Hanaoka, San Jose, CA (US); Michiko Yoshida, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/332,301

(22) PCT Filed: Aug. 29, 2017

(86) PCT No.: PCT/US2017/049213
§ 371 (c)(1),
(2) Date: Mar. 11, 2019

(87) PCT Pub. No.: WO2019/045696
PCT Pub. Date: Mar. 7, 2019

(65) Prior Publication Data
US 2020/0183706 A1  Jun. 11, 2020

(51) Int. Cl.
*G06F 1/24* (2006.01)
*G06F 9/445* (2018.01)
*G06F 9/54* (2006.01)
*G06F 9/4401* (2018.01)

(52) U.S. Cl.
CPC ............ *G06F 9/44505* (2013.01); *G06F 9/54* (2013.01); *G06F 9/4411* (2013.01)

(58) Field of Classification Search
CPC ................................ G06F 9/44505; G06F 9/54
USPC ........................................................ 713/100
See application file for complete search history.

(56) References Cited

U.S. PATENT DOCUMENTS

| 2013/0083693 | A1* | 4/2013 | Himura | H04L 12/4641 370/254 |
| 2015/0095679 | A1* | 4/2015 | Gossain | H04N 21/4436 713/323 |
| 2016/0070817 | A1* | 3/2016 | Aggarwal | G06F 16/24568 707/798 |
| 2017/0005736 | A1* | 1/2017 | Gage | H04L 1/20 |
| 2017/0140283 | A1* | 5/2017 | Cheng | G06N 20/00 |

OTHER PUBLICATIONS

International Search Report and Written Opinion for related International Application No. PCT/US2017/049213, dated Nov. 6, 2017; 13 pages.

* cited by examiner

*Primary Examiner* — Volvick Derose
(74) *Attorney, Agent, or Firm* — Procopio, Cory, Hargreaves & Savitch LLP

(57) ABSTRACT

Example implementations described herein are directed to the management of data received from an edge side when an update is issued to edge nodes from a core apparatus. When the edge nodes receive the update, the receipt of the update may not be uniform (e.g., due to latency, downtime, etc.), which results in an intermediate state where some edge nodes are updated and some edge nodes are not. Example implementations described herein address the processing of data from edge nodes when such an intermediate state occurs by conducting reprocessing of data when data is transmitted from edge nodes operating from an old configuration.

12 Claims, 11 Drawing Sheets

| Edge id | Current value | Issued value |
|---------|---------------|--------------|
| Edge 1  | 100           | 100          |
| Edge 2  | 90            | 100          |
| Edge 3  | 100           | 100          |
| Edge 4  | 90            | 100          |
| Edge 5  | 100           | 100          |
| ...     | ...           | ...          |

FIG. 5

| Parameter | Value |
|---|---|
| Realtimeness or correctness | correctness |
| ... | ... |

FIG. 8

| Edge id | Old value | New value | State change |
|---|---|---|---|
| Edge 1 | 100 | 101 | |
| Edge 2 | 100 | 100 | X |
| Edge 3 | 90 | 95 | |
| Edge 4 | 90 | 90 | X |
| Edge 5 | 100 | 101 | |
| ... | ... | ... | ... |

FIG. 9

DISTRIBUTED REALTIME EDGE-CORE ANALYTICS WITH FEEDBACK

BACKGROUND

Field

The present disclosure is generally related to distributed systems, and more specifically, to distributed real time edge-core analytics with feedback.

Related Art

In related art implementations, analytics has been utilized in applications for business and social infrastructure such as business intelligence, customer marketing, efficient system operations, and so on. Most of the analytics architecture is both distributed and centralized, which involves collecting data at the edge and analyzing it both at the edge and core. Each aspect can involve different analytics depending on its business needs. For example, edge analytics may involve local analytics to cover only a certain area and immediate feedback to the equipment whereas core analytics may be more aggregated business related analytics. Edge and possible core analytics may need to be done in near-real-time to take action based on current state.

Analytics can require parameters or configuration in addition to the analytics algorithm itself. One example involves threshold-based event detection. If the value of data (e.g, temperature data) exceeds a certain threshold (e.g., 40 F), the system can be configured to raise alerts to notify the user, or trigger an action. In this example, threshold is a parameter and its value is 40. In an example system, the alert may not be triggered when only one edge exceeds the threshold, but triggered when some of them (more than N) exceeds the threshold. With an edge-core architecture, the edge sends an event if its value exceeds a certain threshold, and then the core counts the number of events and triggers alerts if the count exceeds a certain threshold. Depending on the desired implementation, this threshold can be different from the threshold on the edge.

In related art implementations, the parameters and configurations may not frequently change, but can be changed to adjust the analytics results. For example, the threshold may be changed if too many alerts are generated with current state, and the user may want to increase the value. In addition, machine learning or other kinds of algorithm can calculate better parameters based on the large set of history data, thereby causing the parameters to change over time.

In related art implementations, parameter changes are done at the core by human users or through machine learning based decisions. The changed parameters have to be delivered to and updated at the edge side analytics. Since the number of edges is typically larger than two and not all of the edges can incorporate changes immediately, there will be an intermediate state in which some of the edges retain the old state (e.g., threshold), while other edges may be updated to the new state. In related art implementations, it may not be practical to ensure all of the edges are updated at once, because there may be an unstable network or too many edges to update. In the above example, when the threshold is increased from 40 F to 50 F, some edges may send error events based on 50 F (new threshold), and some of edge send events based on 40 F (old threshold), until all the edge deploys the new threshold of 50 F.

In related art implementations, configuration management software including Open Source Software (OSS) implementations oversee the configuration updates and tracks the current state of components managed by the software. However, such implementations are not aware of the semantics of the change, and do not manage situations when results are provided from edges having the old configuration.

SUMMARY

Example implementations described herein are directed to the management of an intermediate state of an edge side analytics update on a core side. The example implementations described herein can be used for many analytics using edge-core architecture and has edge side configuration/parameter updates.

Aspects of the present disclosure can include an apparatus configured to manage a plurality of edge nodes, the apparatus configured to receive streaming data from the plurality of edge nodes, the plurality of edge nodes configured to output the streaming data based on first parameters. The apparatus can involve a memory, configured to manage state information for each of the plurality of edge nodes, the state information including the first parameters of each of the edge nodes; and a processor, configured to, for when an update is issued from the apparatus to the plurality of edge nodes to update the first parameters to second parameters, determine, from the state information a first mode or a second mode based on edge nodes that have applied the second parameters; for the determination indicative of the first mode, conduct reprocessing on the streaming data from the plurality of edge nodes based on the second parameters, and conduct analytics on the reprocessed streaming data; for the determination indicative of the second mode, conduct analytics on the streaming data.

Aspects of the present disclosure further include a method for managing a plurality of edge nodes, the plurality of edge nodes configured to output the streaming data based on first parameters. The method can include managing state information for each of the plurality of edge nodes, the state information comprising the first parameters of each of the plurality of edge nodes; and when an update is issued to the plurality of edge nodes to update the first parameters to second parameters, determining, from the state information, a first mode or a second mode based on edge nodes that have applied the second parameters; for the determination indicative of the first mode, conducting reprocessing on streaming data from the plurality of edge nodes based on the second parameters, and conducting analytics on the reprocessed streaming data; and for the determination indicative of the second mode, conducting analytics on the streaming data.

Aspects of the present disclosure further include a non-transitory computer readable medium, storing instructions for managing a plurality of edge nodes, the plurality of edge nodes configured to output the streaming data based on first parameters. The instructions can involve managing state information for each of the plurality of edge nodes, the state information comprising the first parameters of each of the plurality of edge nodes; and when an update is issued to the plurality of edge nodes to update the first parameters to second parameters determining, from the state information, a first mode or a second mode based on edge nodes that have applied the second parameters; for the determination indicative of the first mode, conducting reprocessing on streaming data from the plurality of edge nodes based on the second parameters, and conducting analytics on the reprocessed streaming data; and for the determination indicative of the second mode, conducting analytics on the streaming data.

Aspects of the present disclosure can include a system configured to manage a plurality of edge nodes, the system configured to receive streaming data from the plurality of edge nodes, the plurality of edge nodes configured to output the streaming data based on first parameters. The system can involve means for managing state information for each of the plurality of edge nodes, the state information including the first parameters of each of the edge nodes; and, for when an update is issued from the system to the plurality of edge nodes to update the first parameters to second parameters, means for determining, from the state information a first mode or a second mode based on edge nodes that have applied the second parameters; for the determination indicative of the first mode, means for conducting reprocessing on the streaming data from the plurality of edge nodes based on the second parameters, and means for conducting analytics on the reprocessed streaming data; for the determination indicative of the second mode, means for conducting analytics on the streaming data.

Through the example implementations described herein, when an update is transmitted to the edge nodes and some of the edge nodes have not updated (e.g., due to lag, downtime, in process of transmission, etc.), reprocessing of data is conducted on such data so that even when data is received from edge nodes operating under the older configuration, the integrity of the analytics applied to the data can be maintained.

BRIEF DESCRIPTION OF DRAWINGS

FIG. 5 illustrates an example of edge state management table, in accordance with an example implementation.

FIG. 8 illustrates an example of a configuration table, in accordance with an example implementation.

FIG. 9 illustrates another example of an edge state management table, in accordance with an example implementation.

DETAILED DESCRIPTION

Figure 1:
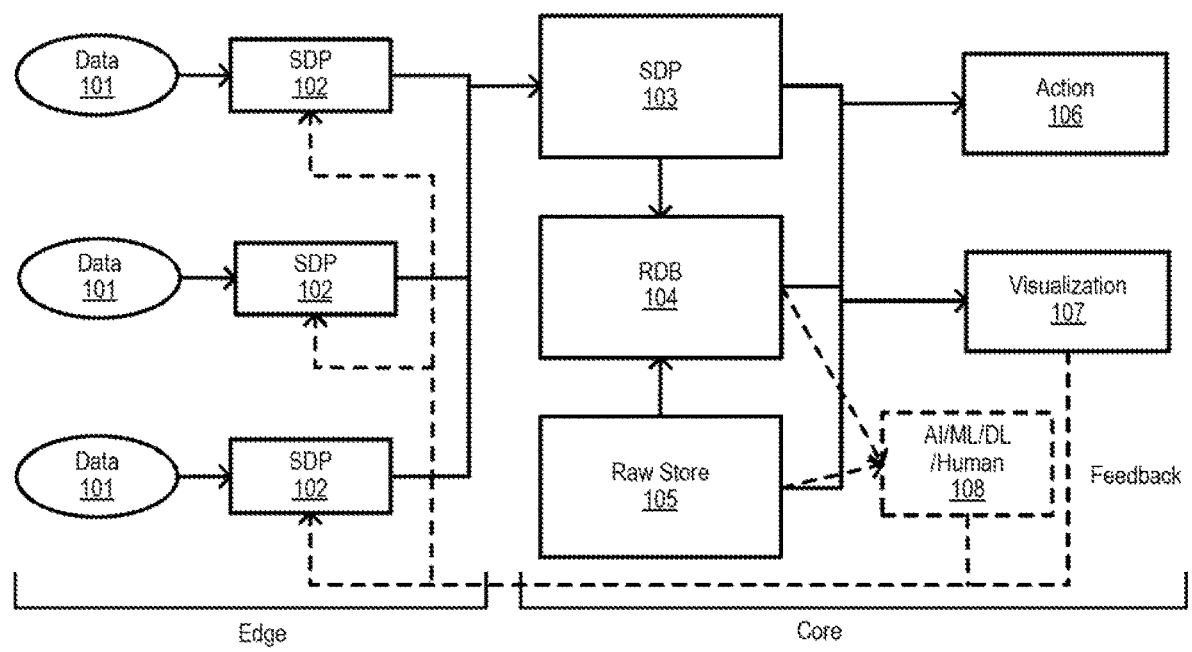
FIG. 1 illustrates an example system architecture.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example system architecture. In an example system architecture, In the edge, data 101 is generated and real-time streaming data processing (SDP) 102 processes the data 101, conducts edge-side analytics, and sends aggregates or insights to core side streaming data processing 103. In the core side, the streaming data processing 103 obtains data 101 from all elements of the edge, conducts core-side analytics, and provides the analytics to an action element 106 or visualization element 107. The core side SDP 103 can also be configured to provide the data as historical data for storage into the relational database (RDB) 104. In some cases, all the raw data can be sent separately from the edge and stored in raw data store 105. The RDB and the raw data store can then be utilized by a management system 108, which can involve any of human management, deep learning (DL), machine learning (ML), and artificial intelligence (AI).

Figure 2:
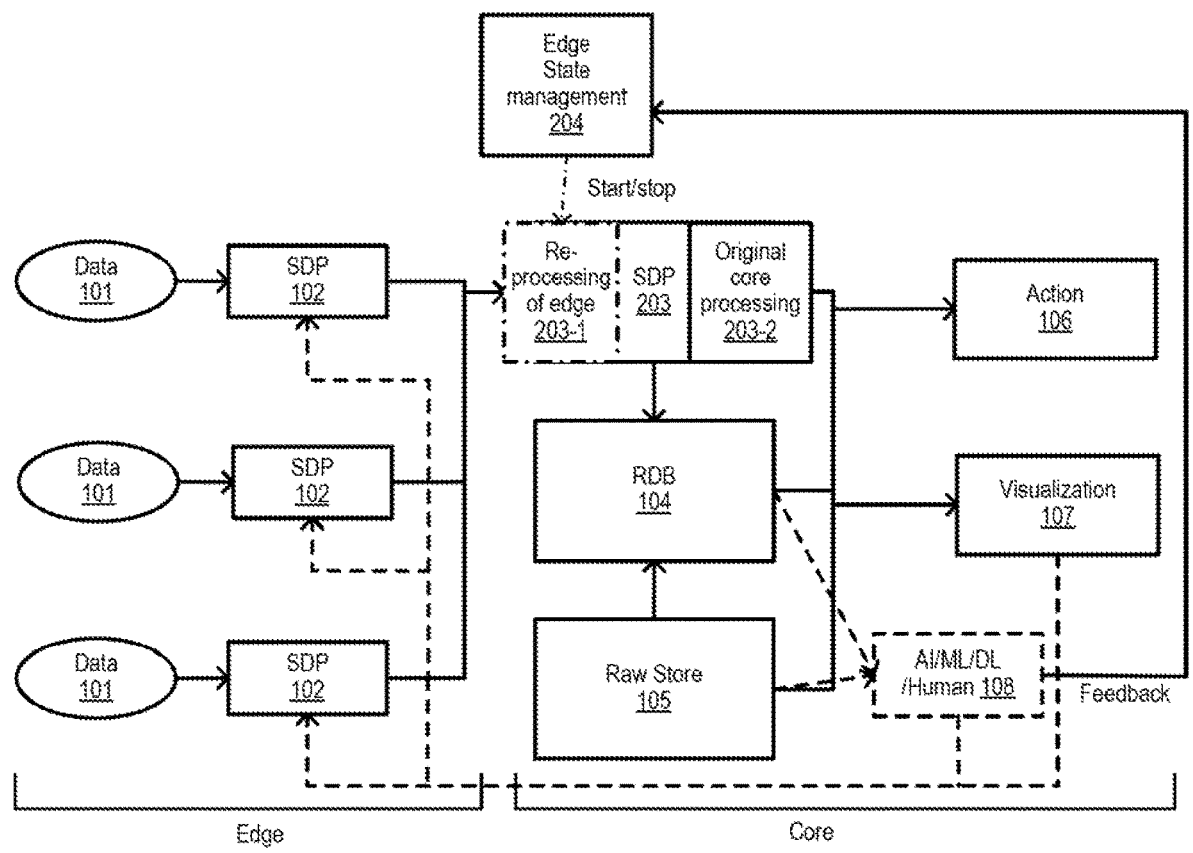
FIG. 2 illustrates an overall architecture the system, in accordance with an example implementation.

FIG. 2 illustrates an overall architecture the system, in accordance with an example implementation. In an example implementation of the system, the core side has two additional components: one involves an edge state management 204 which tracks the current edge side state whether the new updates are applied or not. The other is reprocessing part for the edge 203-1 which be started by edge state management 204 and which is configured to take care of the reprocessing of results from edge analytics with respect to the old state. The core side SDP 203 also retains the original core processing 203-2 functionality.

If the core-side can manage edges having the intermediate state by reprocessing the edge-side processing (e.g., such as processing conducted based on increased threshold), then reprocessing is conducted at the core-side. During the intermediate state, in which some of edge nodes have the new configuration whereas some of the edge nodes have not been updated yet, edge state management 204 starts reprocessing to cover up the intermediate state. In an example implementation, if all of, or certain percentage (e.g., 80%) of edges change to the new state and are updated, the core side SDP 203 can stop the reprocessing 203-1 and conduct original core processing 203-2. To track the edge state, the edge node sends an acknowledgment (e.g., ack, which can also include the current value) when the edge node changes its state, and then edge state management 204 in the core side manages the edge side state.

Figure 3:
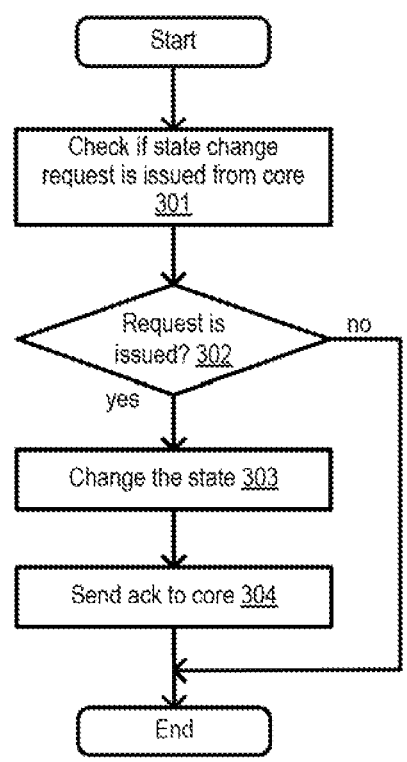
FIG. 3 illustrates an example flow for an edge node, in accordance with an example implementation.

FIG. 3 illustrates an example flow for an edge node, in accordance with an example implementation. At 301 the edge node checks if state change request is issued from the core. At 302, a determination is made as to whether the request has been issued. If the state change request is issued (Yes), then the flow proceeds to 303 to change the edge state, whereupon the edge node sends an ack to core at 304.

Figure 4:
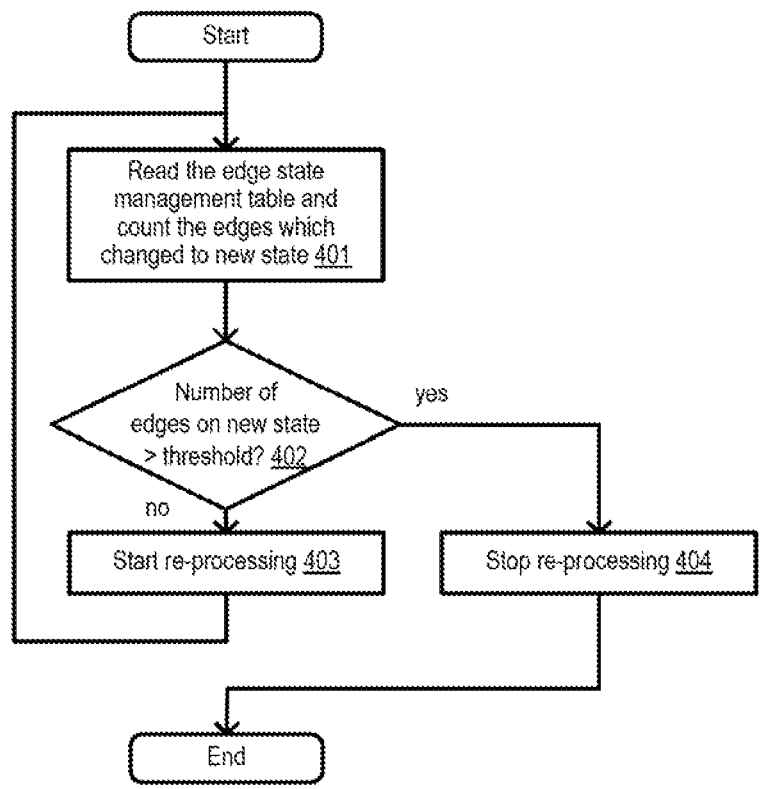
FIG. 4 illustrates an example flow for edge state management, in accordance with an example implementation.

FIG. 4 illustrates an example flow for edge state management 204, in accordance with an example implementation. In an example implementation, the edge state management 204 can be configured to operate in different modes. In an example of a first mode of operation, an update is issued to the edge nodes managed by edge state management 204, whereupon it can be expected that time will be taken for the edge nodes to update and send an ack back to the edge state management 204. Thus, in the first mode of operation, reprocessing is conducted on the streaming data based on the new parameters issued, whereupon analytics is conducted on the reprocessed streaming data. The first mode of operation can be initiated when an update is issued to one or more edge nodes, when the received acknowledgements do not exceed a given threshold, or through other methods depending on the desired implementation. In example implementations, the first mode of operation can be maintained until the updates are processed.

In an example of a second mode of operation, analytics are conducted on the streaming data as it is presumed that a sufficient number of the edge nodes have updated to the new parameters in response to the issued command. The second mode of operation can be triggered based on receiving a number of acks that exceed a threshold, or through other methods that inform the edge state management 204 that the number of edge nodes operating on the new parameters exceed a threshold such as referencing the edge state management table as illustrated in FIG. 5 or FIG. 9.

At 401, the edge state management 204 reads the edge state management table and counts the number of edge nodes that have updated to the new state. At 402, a determination is made as to whether the number of edge nodes that have updated exceed a threshold. If the number of edge nodes that have updated to a new state does not exceed a threshold (No), then the flow proceeds to 403 to execute the reprocessing 203-1 of the edge node results and execute the first node of operation. Otherwise, if the number of edge nodes exceeds the threshold (Yes), then the edge state management 204 stop reprocessing at 404 and executes the second mode of operation.

FIG. 5 illustrates an example of edge state management table, in accordance with an example implementation. The edge state management table manages the state of each edge node. The edge state management table can include the identifier (ID) of the edge node, the current value or state of the edge node, and the issued value or state to the edge node. The current value or state of the edge node indicates the present value or state that the edge node is operating on. The issued value or state to the edge node is indicative of the value that the edge state management 204 issued to the corresponding edge node. As illustrated in FIG. 5, edge state management table manages the state information for each of the plurality of edge nodes, and can be used by edge state management 204 to determine whether each edge node is operating on the old parameters or the new parameters.

Figure 6A:
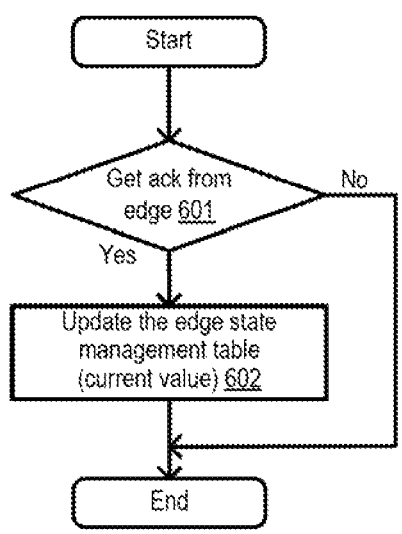
FIGS. 6(a) and 6(b) illustrates an example flow diagram for the edge state management to update the edge management table, in accordance with an example implementation.
Figure 6B:
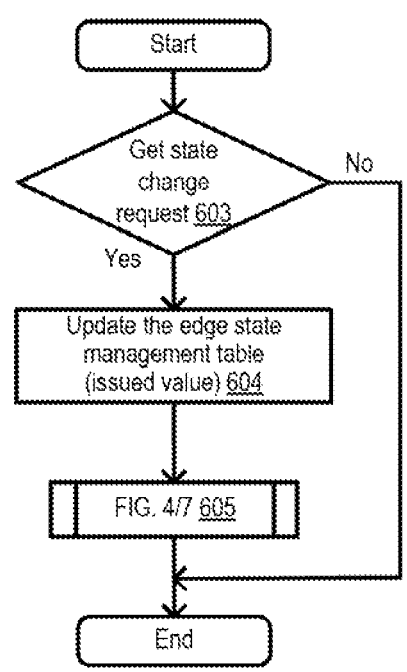

FIGS. 6(a) and 6(b) illustrates an example flow diagram for the edge state management 204 to update the edge management table, in accordance with an example implementation. Specifically, FIG. 6(a) illustrates the flow for the edge state management 204 to update the edge management table based on receipt of acknowledgement from the edge nodes, and FIG. 6(b) illustrates the flow for the edge state management 204 to update the edge management table based on receipt of an update command for edge nodes from management 108. In the flow of FIG. 6(a), a determination is made as to whether an ack has been obtained from the edge node at 601. If so (Yes), then the flow proceeds to 602 to update the edge state management table by updating the current value for the corresponding edge node with the value issued to the edge node, otherwise (No) the flow ends. In the flow of FIG. 6(b), a determination is made as to whether a state change request has been made by management 108 at 603. If so (Yes), then the flow proceeds to 604 to update the edge state management table by updating the issued value of the corresponding edge node with the value provided by management 108, and then proceeds to 605 to execute the flow of FIG. 4 and/or FIG. 7 depending on the desired implementation. Otherwise (No), the flow ends.

Figure 7:
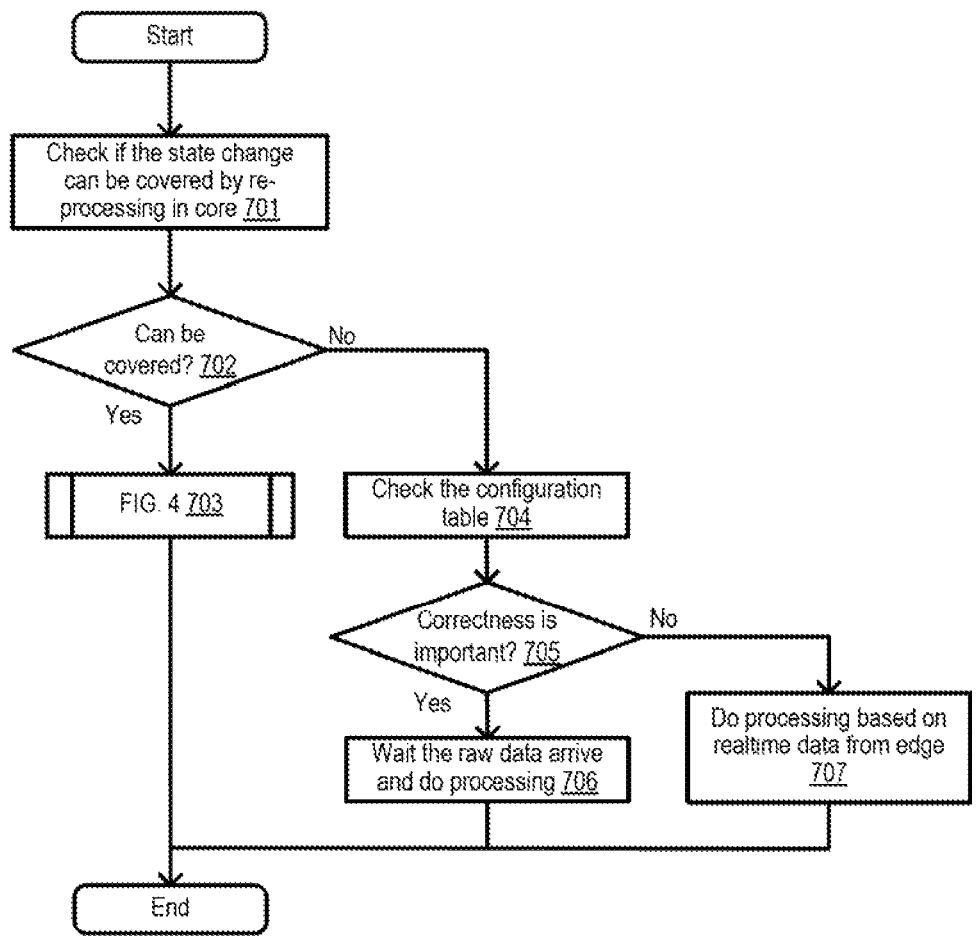
FIG. 7 illustrates an example flow for edge state management, in accordance with an example implementation.

FIG. 7 illustrates an example flow for edge state management 204, in accordance with an example implementation. At 701, the edge state management 204 checks to see if the state change can be covered by conducting reprocessing of the edge result in the core. At 702, a determination is made as to whether reprocessing of the edge result can be conducted in the core. If the edge state change can be covered by reprocessing in core (Yes), then the flow proceeds to 703 to execute the flow of FIG. 4 to conduct the reprocessing. The determination as to whether reprocessing of the edge result can be conducted in the core is made based on the type of changes between the new parameters and the old parameters. If the type of change is one that would allow for reprocessing, then the reprocessing is conducted. For example, if the type of change is a change that results in an increase of possible data points that would be considered valid data to (e.g. increase or decrease to a threshold that expands possible valid data, inclusion of data types or data sets that would expand possible valid data, etc.), then reprocessing should not be conducted as the edge node would be filtering valid data on the edge side, thereby preventing the core from reprocessing the data for validity. On the other hand, if the type of change would result in a decrease of possible data points that could be considered as valid data, then reprocessing can be applied as the entire set of possible data points that are valid data would be sent to the core for reprocessing, wherein the core can conduct reprocessing to determine which data is valid and which is not.

Otherwise, if the core side processing cannot completely cover the old state, as the edge node would prevent the entire possible set of valid data from being transmitted to the core side (No), then the flow proceeds to 704 to check the configuration table, as reprocessing is not applicable. At 705, a determination is made as to whether correctness or real-timeness is desired for the corresponding edge node. If correctness is more important than real-timeness (Yes), then the flow proceeds to 706 to wait for the raw data and conducting processing from the raw data. Otherwise, if real-timeness is more important than correctness (No), the flow proceeds to 707 to utilize realtime data from edge even if the data was processed by the edge based on the older configuration.

FIG. 8 illustrates an example of a configuration table, in accordance with an example implementation. The configuration table includes a flag to indicate whether the priority is set for realtimeness and correctness. In example implementations, the administrator can set the configuration, or other methods can be utilized depending on the desired implementation. In this example, correctness is set to more important than realtimeness.

In an example implementation where the edges do not share a uniform threshold or configuration, the state change can be recorded to determine which edges have processed the updates.

FIG. 9 illustrates another example of an edge state management table, in accordance with an example implementation. The example implementation of FIG. 9 is identical to FIG. 5, with an additional column to mark if the state change was effected (e.g., an ACK was received from the edge ID). In the example implementation of FIG. 9, such an example implementation can thereby manage edges with different thresholds or configurations so that the edges do not need to be uniform. The state change identifier can thereby track which edges have been updated despite having differing thresholds.

Figure 10:
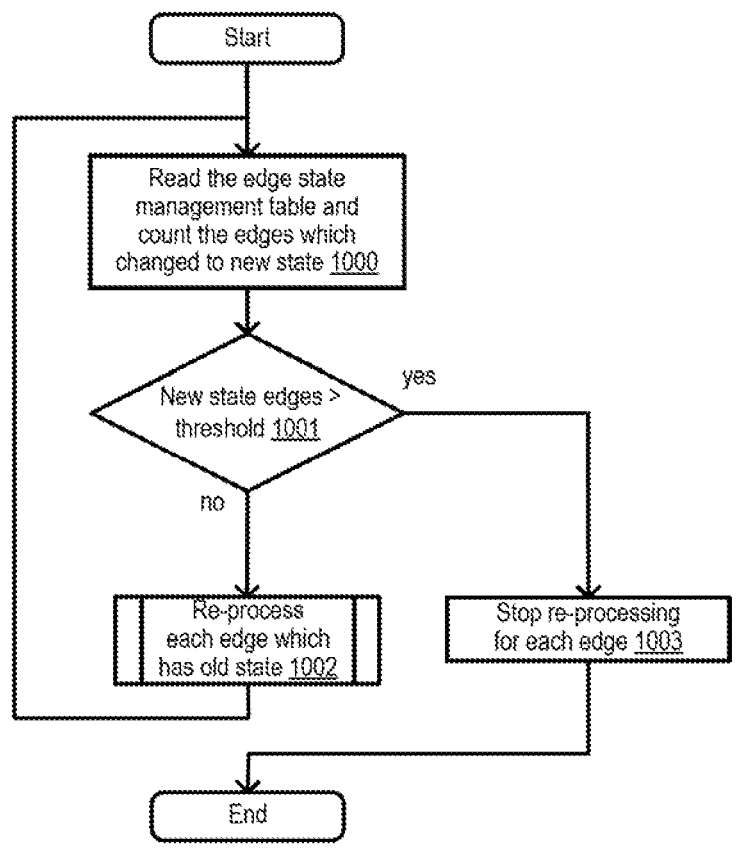
FIG. 10 illustrates an example flow for edge state management, in accordance with an example implementation.

FIG. 10 illustrates a flow diagram, in accordance with an example implementation. Specifically, FIG. 10 is the implementation of FIG. 4, only that the new parameters are not uniform across all edges and thereby need to be tracked by using the state change column of FIG. 9. At 1000, the flow reads the edge state management table from FIG. 9 and counts the number of edges that have updated to the new state. At 1001, a check is performed to determine if the number new state edges exceed a threshold. If so (yes), then the flow proceeds to 1003 to stop the reprocessing for the edges. Otherwise (no), the flow proceeds to 1002 to reprocess each of the edges that retain the old configuration.

Figure 11:
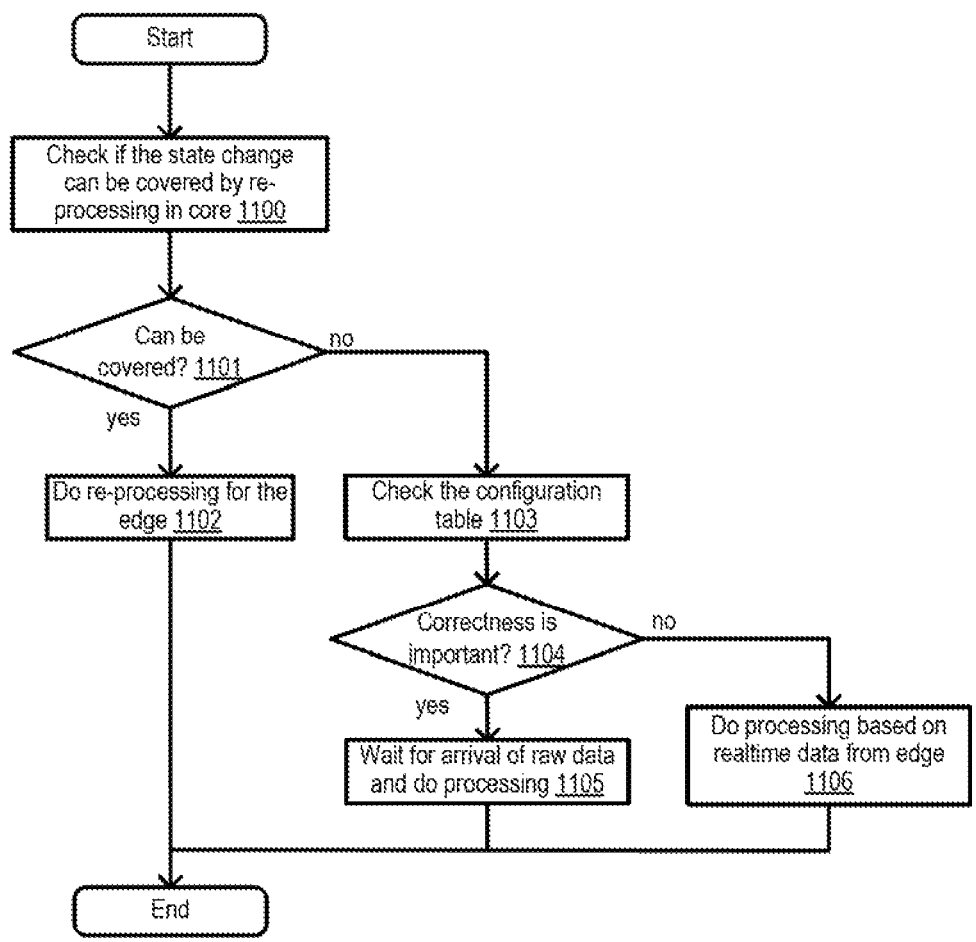
FIG. 11 illustrates an example flow for a state change, in accordance with an example implementation.

FIG. 11 illustrates a flow diagram for a state change, in accordance with an example implementation. Specifically, FIG. 11 illustrates an example flow diagram for a state change in view of the example implementations illustrated in FIGS. 9 and 10, and is otherwise identical to the implementation of FIG. 7. At 1100, the edge state management 204 checks to see if the state change can be covered by conducting reprocessing of the edge result in the core. At 1101, a determination is made as to whether reprocessing of the edge result can be conducted in the core. If the edge state change can be covered by reprocessing in core (Yes), then the flow proceeds to 1102 to execute the reprocessing for results received from each edge node indicated in FIG. 9 as not having completed the state change.

Otherwise, if the core side processing cannot completely cover the old state (No), then the flow proceeds to 1103 to check the configuration table as illustrated in FIG. 8. At 1104, a determination is made as to whether correctness or real-timeness is desired for the corresponding edge node. If correctness is more important than real-timeness (Yes), then the flow proceeds to 1105 to wait for the raw data and conduct processing from the raw data. Otherwise. if real-timeness is more important than correctness (No), the flow proceeds to 1106 to utilize realtime data from edge even if the data was processed by the edge based on the older configuration.

Figure 12:
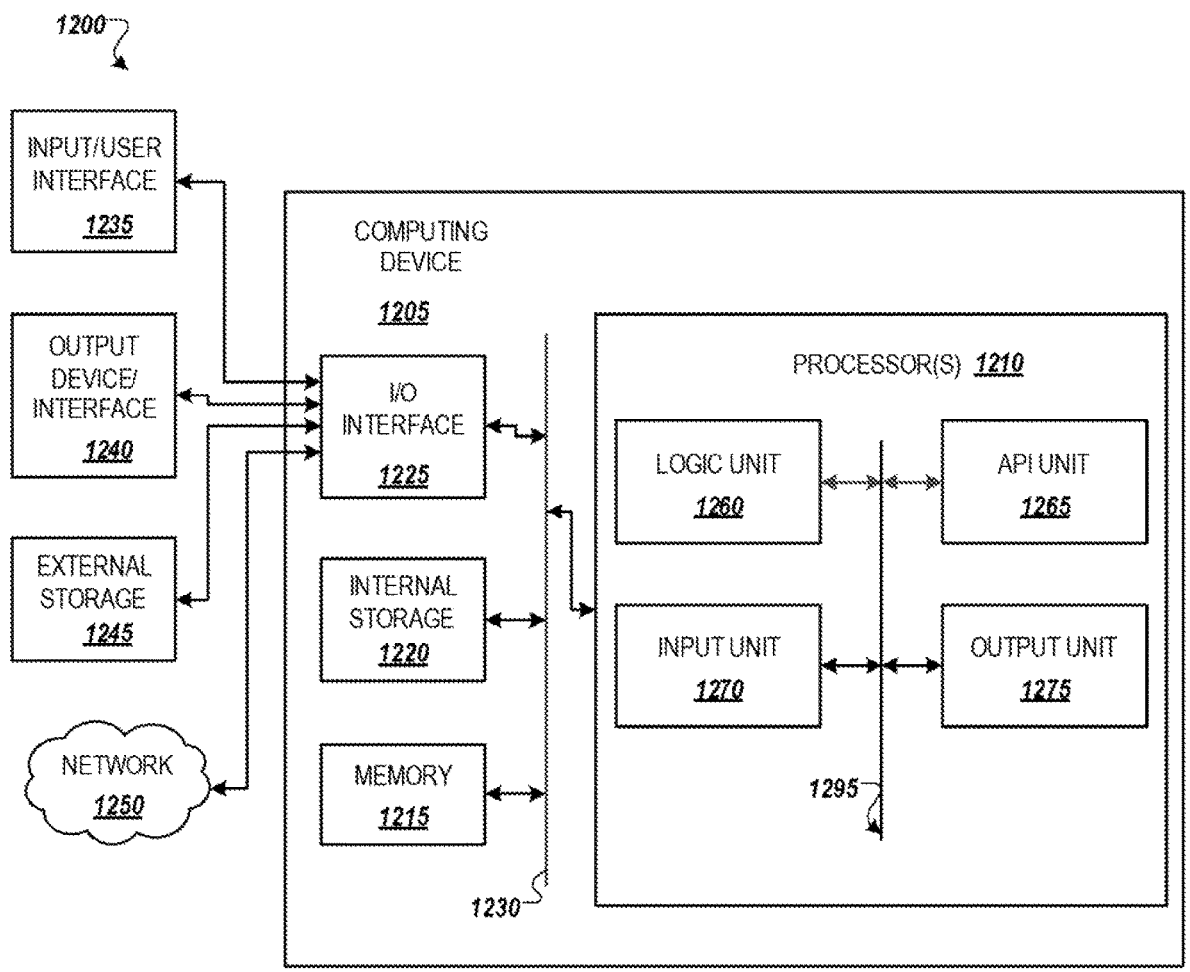
FIG. 12 illustrates an example computing environment with an example computer device suitable for use in some example implementations.

FIG. 12 illustrates an example computing environment with an example computer device suitable for use in some example implementations, such as a core apparatus configured to manage the functionality of the core system as illustrated in FIG. 2. As illustrated in FIG. 2, such an apparatus can be configured to manage a plurality of edge nodes on the edge side and configured to receive streaming data from the plurality of edge nodes. The plurality of edge nodes configured to output the streaming data based on first parameters as described herein.

Computer device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and/or I/O interface 1225, any of which can be coupled on a communication mechanism or bus 1230 for communicating information or embedded in the computer device 1205. I/O interface 1225 is also configured to receive images from cameras or provide images to projectors or displays, depending on the desired implementation.

Computer device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via I/O interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, input unit 1270, output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide output based on the calculations described in example implementations.

Memory 1215 can be configured to manage state information for each of the plurality of edge nodes, wherein the state information can involve the first parameters of each of the plurality of edge nodes as illustrated in FIG. 5 and FIG. 9.

Processor(s) 1210 can be configured to, for when an update is issued from the apparatus to the plurality of edge nodes to update the first parameters to second parameters (e.g., through having an update issued by management 108 as illustrated in FIG. 6(*b*)), determine, from the state information, a first mode or a second mode based on edge nodes that have applied the second parameters as illustrated in FIG. 4 and FIG. 10; for the determination indicative of the first mode, conduct reprocessing on the streaming data from the plurality of edge nodes based on the second parameters, and conduct analytics on the reprocessed streaming data as illustrated in FIGS. 7 and 11; and for the determination indicative of the second mode, conduct analytics on the streaming data as illustrated in FIGS. 4 and 10. As illustrated in FIGS. 4 and 10, the second mode can be indicative of a number of the plurality of edge nodes operating on the second parameters exceeding a threshold.

Processor(s) 1210 can also be configured to conduct reprocessing on the streaming data from the plurality of edge nodes based on the second parameters by being configured to determine whether reprocessing is applicable based on a type of change between the first parameters and the second parameters; and for a determination that the reprocessing is applicable, conduct the reprocessing on the streaming data as illustrated in the flows from 701 to 703 of FIG. 7 and from 1100 to 1102 of FIG. 11. Further, processor(s) 1210 can be configured to, for the determination that the reprocessing is not applicable, determine if a priority for the stream data is indicative of real time processing or correctness; for the priority indicative of real time processing, conduct reprocessing on the stream data; and for the priority indicative of correctness, wait for arrival of raw data associated with the stream data, and conduct processing on the raw data as illustrated in the flow from 704 to 707 of FIG. 7 and from 1103 to 1106 of FIG. 11.

Further, processor(s) 1210 can be configured to determine whether reprocessing is applicable based on a type of change between the first parameters and the second parameters, by being configured to determine if the type of change is a change that increases possible valid data; and for the type of change determined to be the change that increases possible valid data, determine that reprocessing is not applicable as illustrated in FIG. 7 and FIG. 11 at the flows of 702 and 1101.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), graphics processing units (GPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software.

Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. An apparatus configured to manage a plurality of edge nodes, the apparatus configured to receive streaming data from the plurality of edge nodes, the plurality of edge nodes configured to output the streaming data based on first parameters, the apparatus comprising:
   a memory, configured to manage state information for each of the plurality of edge nodes, the state information comprising the first parameters of each of the plurality of edge nodes; and
   a processor, configured to, for when an update is issued from the apparatus to the plurality of edge nodes to update the first parameters to second parameters:
      determine, from the state information, a first mode or a second mode based on edge nodes that have applied the second parameters, wherein the second mode is indicated by a number of the plurality of edge nodes operating on the second parameters exceeding a threshold number of edge nodes;
      for the determination indicative of the first mode, conduct reprocessing on the streaming data from the plurality of edge nodes based on the second parameters, and conduct analytics on the reprocessed streaming data; and
      for the determination indicative of the second mode, conduct analytics on the streaming data,
      wherein the streaming data output by the plurality of edge nodes comprises temperature data of the plurality of edge nodes and the conducting analytics comprises conducting analytics on the temperature data.

2. The apparatus of claim 1, wherein the processor is configured to conduct reprocessing on the streaming data from the plurality of edge nodes based on the second parameters by being configured to:
   determine whether reprocessing is applicable based on a type of change between the first parameters and the second parameters; and
   for a determination that the reprocessing is applicable, conduct the reprocessing on the streaming data.

3. The apparatus of claim 2, wherein the processor is configured to, for the determination that the reprocessing is not applicable, determine if a priority for the stream data is indicative of real time processing or correctness;
   for the priority indicative of real time processing, conduct reprocessing on the stream data; and
   for the priority indicative of correctness, wait for arrival of raw data associated with the stream data, and conduct processing on the raw data.

4. The apparatus of claim 2, wherein the processor is configured to determine whether reprocessing is applicable based on a type of change between the first parameters and the second parameters, by being configured to:
   determine if the type of change is a change that increases possible valid data; and
   for the type of change determined to be the change that increases possible valid data, determine that reprocessing is not applicable.

5. A method for managing a plurality of edge nodes, the plurality of edge nodes configured to output the streaming data based on first parameters, the method comprising:
   managing state information for each of the plurality of edge nodes, the state information comprising the first parameters of each of the plurality of edge nodes; and
   when an update is issued to the plurality of edge nodes to update the first parameters to second parameters:
      determining, from the state information, a first mode or a second mode based on edge nodes that have applied the second parameters, wherein the second mode is indicated by a number of the plurality of edge nodes operating on the second parameters exceeding a threshold number of edge nodes;
      for the determination indicative of the first mode, conducting reprocessing on streaming data from the plurality of edge nodes based on the second parameters, and conducting analytics on the reprocessed streaming data; and
      for the determination indicative of the second mode, conducting analytics on the streaming data;
      wherein the streaming data output by the plurality of edge nodes comprises temperature data of the plurality of edge nodes and the conducting analytics comprises conducting analytics on the temperature data.

6. The method of claim 5, wherein the conducting reprocessing on the streaming data from the plurality of edge nodes based on the second parameters comprises:
   determining whether reprocessing is applicable based on a type of change between the first parameters and the second parameters; and
   for a determination that the reprocessing is applicable, conduct the reprocessing on the streaming data.

7. The method of claim 6, further comprising for the determination that the reprocessing is not applicable, determining if a priority for the stream data is indicative of real time processing or correctness;
   for the priority indicative of real time processing, conducting reprocessing on the stream data; and
   for the priority indicative of correctness, waiting for arrival of raw data associated with the stream data, and conducting processing on the raw data.

8. The method of claim 6, wherein the determining whether reprocessing is applicable based on a type of change between the first parameters and the second parameters comprises:
   determining if the type of change is a change that increases possible valid data; and
   for the type of change determined to be the change that increases possible valid data, determining that reprocessing is not applicable.

9. A non-transitory computer readable medium, storing instructions for managing a plurality of edge nodes, the plurality of edge nodes configured to output the streaming data based on first parameters, the instructions comprising:

managing state information for each of the plurality of edge nodes, the state information comprising the first parameters of each of the plurality of edge nodes; and when an update is issued to the plurality of edge nodes to update the first parameters to second parameters:

determining, from the state information, a first mode or a second mode based on edge nodes that have applied the second parameters, wherein the second mode is indicated by a number of the plurality of edge nodes operating on the second parameters exceeding a threshold number of edge nodes;

for the determination indicative of the first mode, conducting reprocessing on streaming data from the plurality of edge nodes based on the second parameters, and conducting analytics on the reprocessed streaming data; and for the determination indicative of the second mode, conducting analytics on the streaming data, wherein the streaming data output by the plurality of edge nodes comprises temperature data of the plurality of edge nodes and the conducting analytics comprises conducting analytics on the temperature data.

10. The non-transitory computer readable medium of claim 9, wherein the conducting reprocessing on the streaming data from the plurality of edge nodes based on the second parameters comprises:

determining whether reprocessing is applicable based on a type of change between the first parameters and the second parameters; and for a determination that the reprocessing is applicable, conduct the reprocessing on the streaming data.

11. The non-transitory computer readable medium of claim 10, the instructions further comprising for the determination that the reprocessing is not applicable, determining if a priority for the stream data is indicative of real time processing or correctness;

for the priority indicative of real time processing, conducting reprocessing on the stream data; and for the priority indicative of correctness, waiting for arrival of raw data associated with the stream data, and conducting processing on the raw data.

12. The non-transitory computer readable medium of claim 10, wherein the determining whether reprocessing is applicable based on a type of change between the first parameters and the second parameters comprises:

determining if the type of change is a change that increases possible valid data; and for the type of change determined to be the change that increases possible valid data, determining that reprocessing is not applicable.

* * * * *